(12) United States Patent
Staring

(10) Patent No.: US 7,085,929 B1
(45) Date of Patent: Aug. 1, 2006

(54) METHOD AND APPARATUS FOR REVOCATION LIST MANAGEMENT USING A CONTACT LIST HAVING A CONTACT COUNT FIELD

(75) Inventor: Antonius A. M. Staring, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1149 days.

(21) Appl. No.: 09/686,830

(22) Filed: Oct. 11, 2000

(51) Int. Cl.
*H04L 9/32* (2006.01)

(52) U.S. Cl. .................. 713/168; 713/157; 713/158

(58) Field of Classification Search ............... 173/168, 173/193, 157, 158, 201
See application file for complete search history.

(56) References Cited

U.S. PATENT DOCUMENTS

| | | | | |
|---|---|---|---|---|
| 5,173,939 | A * | 12/1992 | Abadi et al. | 707/9 |
| 5,265,221 | A * | 11/1993 | Miller | 711/163 |
| 5,687,235 | A | 11/1997 | Perlman et al. | 380/25 |
| 5,701,458 | A * | 12/1997 | Bsaibes et al. | 707/9 |
| 5,745,574 | A * | 4/1998 | Muftic | 713/157 |
| 6,092,201 | A * | 7/2000 | Turnbull et al. | 713/201 |

FOREIGN PATENT DOCUMENTS

| | | |
|---|---|---|
| EP | 930556 A2 * | 7/1999 |
| WO | WO9716905 | 5/1997 |
| WO | WO9839878 | 9/1998 |

OTHER PUBLICATIONS

W. Ford, "Advances in Public-Key Certificate Standards"; SIGSAC Review, vol. 13, pp 9-15, Jul. 1995, (Abstract).

* cited by examiner

*Primary Examiner*—Justin T. Darrow
(74) *Attorney, Agent, or Firm*—Gregory L. Thorne

(57) ABSTRACT

Access to information is controlled by maintaining, for a given device or other entity through which information may be accessed, a contact list that includes information identifying one or more other entities which have attempted to communicate with the given entity. The contact list further includes a contact count field specifying, for each of the entities on the contact list, the number of times the corresponding entity has attempted to communicate with the given entity. The contact list is utilized in conjunction with a revocation list stored in a memory associated with the given entity in order to determine which of the other entities are authorized to communicate with the given entity. The contact list is updated after a modification of the revocation list, or if a new entity not already included on the contact list attempts to communicate with the given entity. If the contact list does not have sufficient space to accommodate a non-revoked new entity, an entity already on the contact list is selected for removal from the contact list based on its corresponding contact count.

14 Claims, 4 Drawing Sheets

METHOD AND APPARATUS FOR REVOCATION LIST MANAGEMENT USING A CONTACT LIST HAVING A CONTACT COUNT FIELD

FIELD OF THE INVENTION

The present invention relates generally to the field of consumer electronics devices, and more particular to techniques for controlling access to digital recordings and other types of content material via consumer electronics devices.

BACKGROUND OF THE INVENTION

A number of different copy protection techniques have been developed for protecting digital recordings and other types of copyrighted content material from unauthorized use. In many such techniques, the content material is encrypted such that it can only be decrypted using a key accessible to a compliant device. For example, an access control system for copy-protected content material may effect a key exchange with the particular compliant device, using a Diffie-Hellman key exchange or other public key cryptography technique. The access control system then uses the exchanged key to encrypt a decryption key for decrypting the content material, and supplies the decryption key to the device.

In this manner, only the intended compliant device can decrypt the content material. Generally, the access control system does not undertake the key exchange until after the particular compliant device identifies itself, and, in most cases, authenticates this identification, typically via an encrypted signature that can be verified. Other copy protection techniques that rely in whole or in part upon an identification of a receiver or other device are common in the art.

An adversary of the above-described access control system can subvert the copy protection technique by imitating a compliant device. That is, techniques are common in the art for replicating a compliant device, such that, in operation, the replicated device is virtually indistinguishable from the original. A common unauthorized business practice is the sale of "black market" or "pirated" imitations of replicated compliant devices that are intended for use in gaining unauthorized access to copy-protected content material.

In order to counteract such an adversary, device manufacturers, content providers and other issuing authorities typically publish revocation lists, itemizing each identifier that has been determined to be no longer valid. In principle, the access control system receives an identifier from the intended receiving device, compares this identifier to the list of all invalidated identifications, then grants or denies access accordingly. Each issuing authority periodically publishes a list of the recently revoked identifiers, and this list is communicated to each access control system, using a variety of techniques.

For example, if the access control system is a set-top box that only provides broadcast content material to a compliant recorder or display device, the revocation list can be transmitted to the set-top box from the provider of the broadcast services. If the access control system is a consumer optical disk player that only plays back an optical disk to a compliant display device, the latest revocation list can be embedded within commercial optical disk recordings. When the user of the optical disk player plays a recently purchased or rented optical disk recording, the optical disk player reads the embedded list. When the access control system receives a new revocation list, it updates a locally stored list of revocations accordingly. Because the local revocation list at the access control system is of finite size, each access control system is typically configured to delete the oldest revocations when space is required for newer revocations.

A significant drawback of conventional techniques for managing the above-described revocation lists is the amount of computation time and other access control system resources required to determine if a given entity has been revoked. For example, it is generally necessary when using the conventional list management techniques to implement a complete search of a revocation list in order to determine if a given entity initiating communication is authorized to do so. In addition, each time a local revocation list in an access control system is modified, separate determinations generally must be made for a number of other devices, even though the system may be regularly in contact with these devices.

A number of improved techniques for revocation list management are described in U.S. patent application Ser. No. 09/456,689 filed Dec. 9, 1999 in the name of inventor Michael Pasieka and entitled "Method and Apparatus for Revocation List Management," which is incorporated by reference herein. One or more of these techniques utilize a contact list which contains identifiers of particular entities that have attempted to communicate with a given entity, and corresponding revocation flags which indicate whether the particular entities on the contact list have been revoked, i.e., are present on the revocation list. The use of the contact list in conjunction with the revocation list considerably facilitates the determination as to whether particular entities have been revoked. However, despite the considerable advances provided by the techniques described in the above-cited U.S. patent application Ser. No. 09/456,689, a need nonetheless remains for additional improvements in techniques for managing revocation lists, such that the amount of system resources consumed in the list management process can be further reduced.

SUMMARY OF THE INVENTION

The invention provides methods and apparatus for improved management of revocation lists in an access control system.

In an illustrative embodiment of the invention, a contact list is maintained for a given device or other entity through which information may be accessed. The contact list includes information identifying one or more other entities that have attempted to communicate with the given entity. The contact list further includes a contact count field specifying, for each of the entities on the contact list, the number of times the corresponding entity has attempted to communicate with the given entity. The contact list is utilized in conjunction with a revocation list stored in a memory associated with the given entity in order to determine which of the other entities are authorized to communicate with the given entity. The contact list is updated after a modification of the revocation list, or if a new entity not already included on the contact list attempts to communicate with the given entity. If the contact list does not have sufficient space to accommodate a non-revoked new entity, an entity already on the contact list is selected for removal from the contact list based on its corresponding contact count.

Advantageously, the invention ensures that entities that are not revoked will have an increased likelihood of being present on the contact list. This leads to faster authorizations for non-revoked entities, thereby improving the overall efficiency of the revocation list management process, and reducing the amount of computation time and other system resources consumed in access control operations. These and other features and advantages of the present invention will become more apparent from the accompanying drawings and the following detailed description.

DETAILED DESCRIPTION OF THE INVENTION

For purposes of simplicity and clarity of illustration, the present invention is described herein using consumer entertainment applications involving, e.g., access control techniques used to control access to pay-per-view or other broadcast transmissions, or access control techniques used to control the number of copies that can be made of digital recordings or other types of copy-protected content material. However, it should be understood that the invention can be used in numerous other access control applications.

Figure 1:
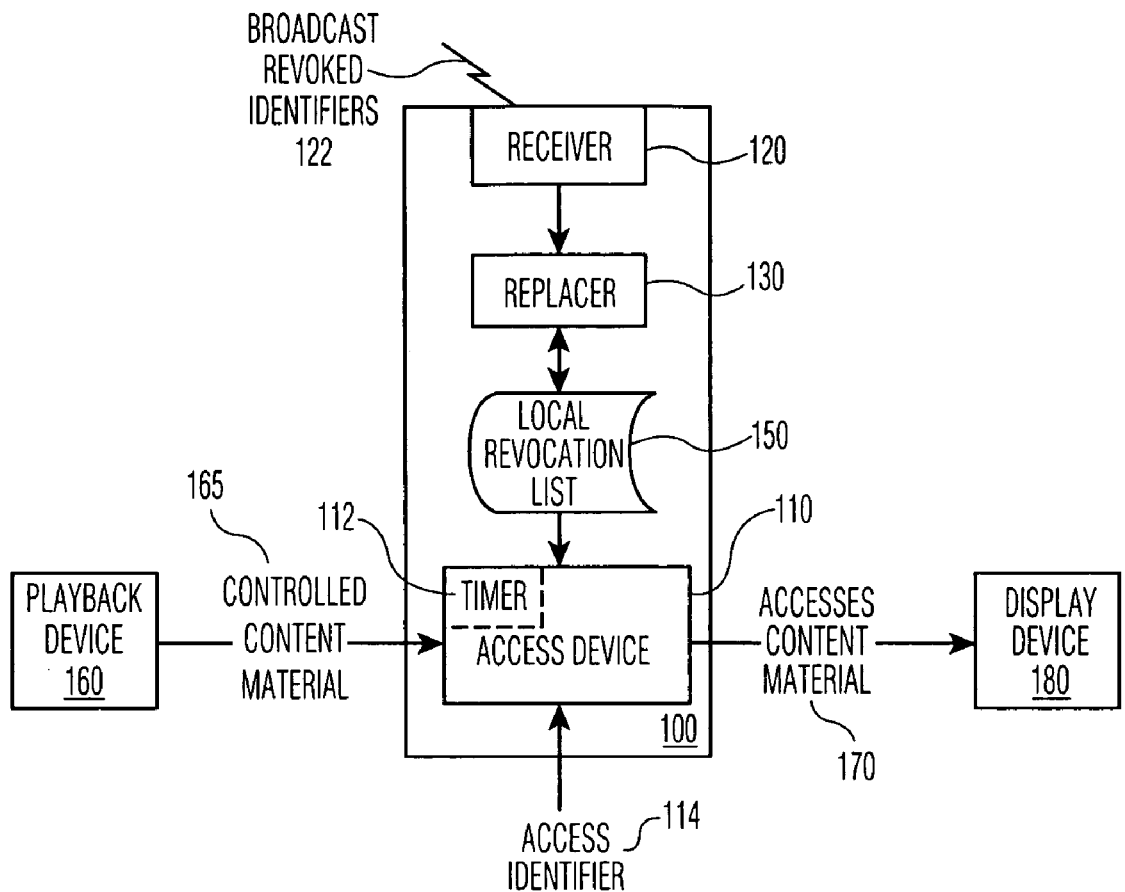
FIG. 1 is a block diagram of an exemplary access control system in which the present invention may be implemented.

FIG. 1 shows an exemplary embodiment of an access control system 100 in which the present invention may be implemented. The access control system 100 includes an access device 110 having associated therewith a timer 112 and an access identifier 114, a receiver 120 configured to receive broadcast revoked identifiers 122, and a replacer 130 which is operative to interact with a local revocation list 150. In this embodiment, the access control system 100 receives, e.g., from a playback device 160, a quantity of content controlled material 165, and if the access identifier 114 is an authorized identifier, delivers corresponding accessed content material 170, e.g., to a display device 180.

It should be noted that playback device 160, access control system 100 and display device 180 may be integrated into a single device. In addition, the display device 180 in other embodiments may be replaced with another type of rendering device.

Generally, the controlled content material 165 is encrypted material, and the access device 110 within the access control system 100 decrypts the encrypted material to create the accessed content material 170 for rendering to a user, e.g., for display on the display device 180. The controlled content material 165 is illustrated in this embodiment as being provided by the playback device 160, which could be, e.g., a compact disk (CD) player, digital versatile disk (DVD) player, or other type of audio or video optical disk player, a magnetic tape player, a hard-drive system, etc. The controlled content material 165 may alternatively be provided via a broadcast system, cable system, satellite system or other service provider, or via a network connection with the Internet or other type of network. As is common in the art, the controlled content material 165 may be communicated among a variety of devices, e.g., to and from a recording device after being received from a service provider, etc.

The access device 110 provides the accessed content material 170 if and only if a valid access identifier 114 is provided. Generally, the access identifier 114 is a unique identifier that is associated with a decryption key and is digitally signed by a special key that is known only to a "trusted authority," typically an authorized vendor or manufacturer, or the provider of the service.

The access identifier 114 may, e.g., be contained within a "smart card" or other type of device that identifies the user, a pre-paid card-based device that does not identify the user, a set-top box, computer, television or other device that identifies an account number for charging fees, etc.

As another example, the access identifier 114 may be a unique identifier of a manufactured item, such as a recording device, that is manufactured to enforce agreed upon copy-limit standards, as discussed, e.g., in U.S. patent application Ser. No. 09/333,628, filed Jun. 15, 1999 in the name of inventor Michael Epstein and entitled "Copy Protection by Ticket Encryption," which is incorporated by reference herein.

The above-noted trusted authorities publish revocation lists comprising access identifiers which have been inappropriately used, and have therefore been revoked. For example, unauthorized copies of recorded material may contain an access identifier that was used to originally access the material, lost or stolen card-based devices may be revoked, etc. The revoked identifiers 122 may be broadcast to access control system 100 in a variety of forms, and are typically broadcast via the medium used to convey the content material.

As previously noted, the access control system 100 includes receiver 120 for receiving the broadcast revoked identifiers 122, and a local revocation list 150. The local revocation list 150 is maintained within an electronic memory or other storage device associated with the access control system 100. The nature of the receiver 120 will generally depend upon the type of broadcast used to supply the revoked identifiers 122. For example, the receiver 120 may be, e.g., a device that extracts the revoked identifiers 122 from the medium used to convey the controlled content material 165. In such an arrangement, each published CD, DVD or other type of optical disk may contain thereon a list of recent revoked identifiers 122. As another example, the receiver 120 may be a dedicated device that receives the broadcast revoked identifiers 122 from a broadcast, cable or satellite system provider via a control channel.

The local revocation list 150 is generally of finite size, and eventually will be filled with the received revoked identifiers 122. The replacer 130 may therefore be configured to randomly replace a previous entry on the list 150 with each received revoked identifier 122, using the techniques described in U.S. patent application Ser. No. 09/370,489, filed Aug. 9, 1999 in the name of inventor Michael Epstein and entitled "Updating a Revocation List to Foil an Adversary," which is incorporated by reference herein. By using such a random or pseudo-random replacement technique, the likelihood of a particular revoked identifier 122 being present on the list 150 is more difficult for an adversary to determine. As a result, an adversary cannot rely on the mere passage of time, i.e., the dropping of older revoked identifiers from a finite-sized list as new identifiers arrive, in order to circumvent the local revocation list 150.

It should be emphasized that the particular configuration of the access control system 100 as shown in FIG. 1 is by way of example only, and that in other embodiments the system 100 may be incorporated into or otherwise associated with the playback device 160, the display device 180, or other suitable device. For example, elements or groups of elements of the system 100 may collectively represent a desktop, laptop or palmtop computer, a personal digital assistant (PDA), a television, or a set-top box, as well as portions or combinations of these and other devices. It should also be understood that the invention may be implemented in other types of systems. For example, one or more of the elements of the system 100 may be implemented at least in part as an application-specific integrated circuit (ASIC), circuit card or other processor-based device to be incorporated into or otherwise associated with a television, computer, set-top box or other device.

Figure 2:
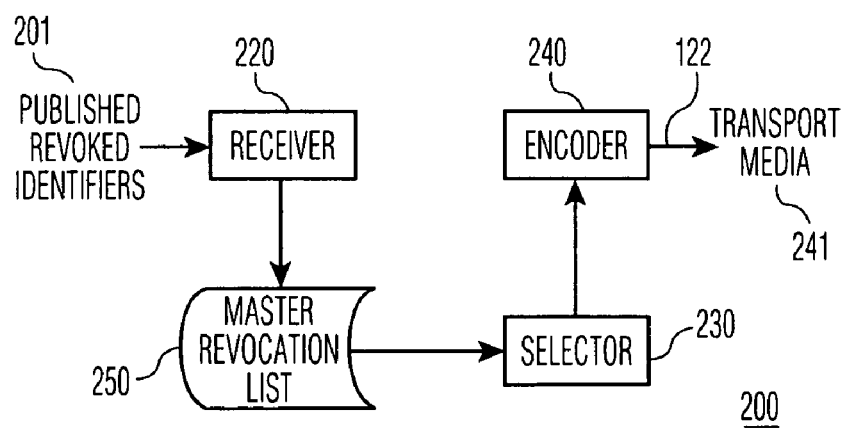
FIG. 2 illustrates the manner in which published revoked identifiers may be supplied to the access control system of FIG. 1.

FIG. 2 shows an example of a system 200 for broadcasting revoked identifiers 122 to access control system 100. Published revoked identifiers 201 are received from one or more trusted authorities via a receiver 220. The system 200 further includes a selector 230, an encoder 240 that interacts with transport media 241, and a master revocation list 250. The published revoked identifiers 201 received by the receiver 220 are stored on the master revocation list 250, which may be substantially larger than the local revocation list 150. For example, the system 200 may be located at a cable system or other service provider headquarters, or at a disk manufacturing plant, and the master revocation list 250 may be resident in a database of virtually unlimited size.

The selector 230 randomly selects published revoked identifiers 201 from the master revocation list 250 for encoding as broadcast revoked identifiers 122 that are communicated to the remote access control system 100 via the transport media 241. The encoder 240 encodes the published revoked identifiers that are selected for broadcasting into a form suitable for the particular transport media 241. For example, the broadcast revoked identifiers 122 may be broadcast in the form of a signal that is multiplexed onto a broadcast carrier, encoded on a track of a CD, DVD or other type of optical disk, included in the header of a VCR tape, etc. Additional details regarding the operation of the system 200 are provided in the above-cited U.S. patent application Ser. No. 09/370,489.

It should be understood that system 200 of FIG. 2 is only one example of a system suitable for conveying revoked identifiers. Numerous other techniques may be used to convey such identifiers to an access control system in conjunction with the utilization of the present invention.

The present invention is directed to techniques for managing revocation lists such as the above-described local revocation list 150 of the access control system 100. As will be described in greater detail below, the invention utilizes a contact list with a contact count field for more efficiently managing revocation list updates in the presence of modifications or additional devices attempting to establish communication with the access control system 100.

Figure 3:
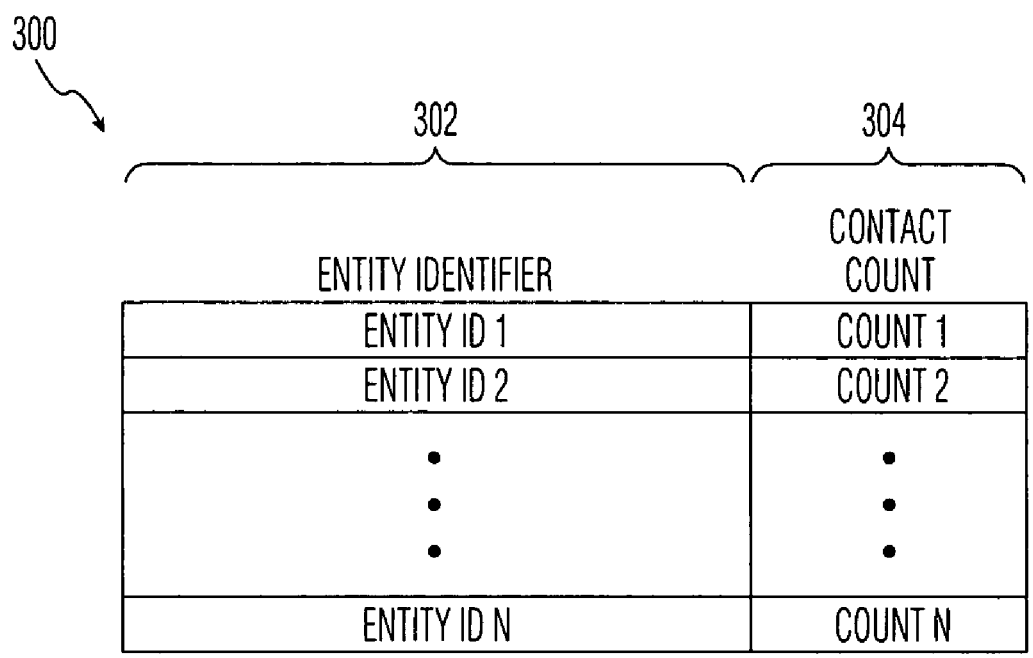
FIG. 3 shows an example of a contact list that is maintained by the access control system of FIG. 1 in accordance with an illustrative embodiment of the invention.

FIG. 3 shows an example of a contact list 300 which includes a set of entity identifiers 302 and a set of corresponding contact counts 304. The entity identifiers 302 generally include an entity identifier for each entity which is in communication with the access control system 100. It is assumed in this embodiment that each of the entities having an identifier on the contact list 300 represents a device that has communicated with the access control system 100. The term "entity" as used herein should therefore be understood to include any type of device that may attempt to establish communications with or otherwise interact with the access control system 100.

Each row of the contact list 300 stores the identifying information for a given entity and a corresponding contact count specifying the number of times that entity has made contact with the access control system 100. For example, the contact list 300 as shown in FIG. 3 includes N entries, with entity identifiers ID 1, ID 2, . . . ID N and corresponding contact counts Count 1, Count 2, . . . Count N.

The contact list 300 may be implemented in a straightforward manner in a memory device incorporated in or otherwise associated with the access control system 100, e.g., it may be implemented in a portion of the memory used to implement the local revocation list 150. The particular value of N may vary depending upon the application, based on factors such as the memory capacity of the access control system 100. The term "list" as used herein is intended to include a table or any other arrangement of information that may be stored in a memory device.

Figure 4:
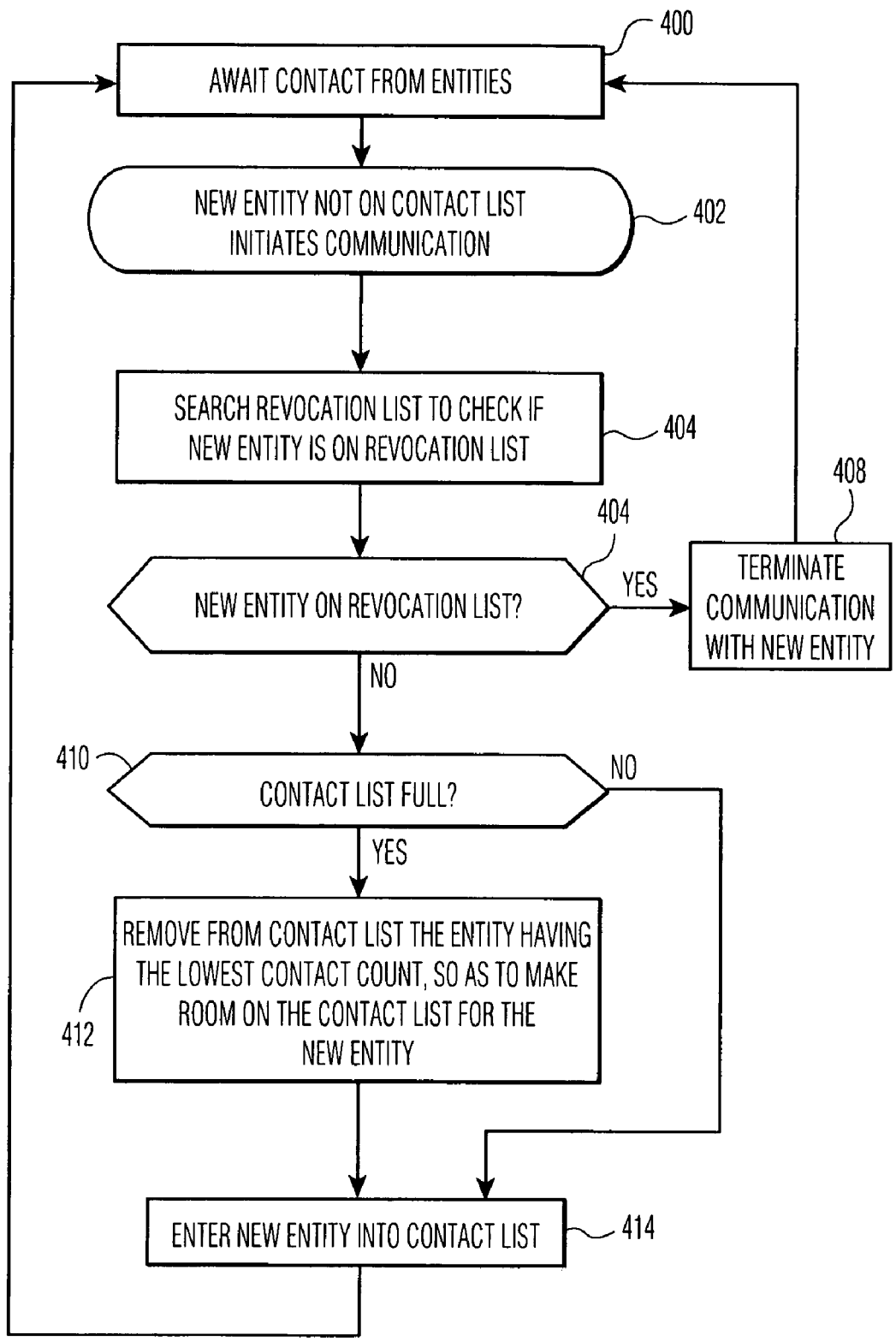
FIGS. 4 and 5 are flow diagrams illustrating update processes performed in conjunction with the contact list of FIG. 3 in the illustrative embodiment of the invention.

FIG. 4 is a flow diagram illustrating the manner in which the contact list 300 may be updated when an entity not already having its identifier stored on the contact list attempts to communicate with the access control system 100. In step 400, the update process awaits contact from entities. In step 402, an entity which is not currently included on the contact list 300 attempts to initiate communication with the access control system 100. This entity is referred to as a "new" entity. A new entity is identified as such by searching through the contact list to determine if the entity is present on that list. If the entity is not present on the contact list, it is considered a new entity.

The revocation list is then searched in step 404 in order to check if the new entity is on the revocation list. The revocation list referred to in this step is assumed to be the local revocation list 150 previously described, but could be another type of revocation list.

If the new entity is determined in step 406 to be on the revocation list, communication with the new entity is terminated in step 408, and the process returns to step 400 to await further contacts.

If the new entity is not on the revocation list, the process determines in step 410 if the contact list is full, i.e., has exceeded its maximum number of entries N. If the contact list is full, the process in step 412 removes from the contact list the entity having the lowest contact count, so as to make room on the contact list for the new entity. Thus, if the contact list is full, the least often used contact is removed from the list in order to make space for the new contact. This ensures that the most frequently used contacts remain on the list.

An identifier for the new entity is subsequently entered into the contact list in step 414, and the contact count field for the new entity is set to a value of 1. If step 410 determines that there is already sufficient space on the contact list for another entity, the process proceeds directly to step 414 as shown, in order to enter the new entity into an available location on the contact list. In any case, after entering the new entity into the contact list, the process returns to step 400 to await further contacts.

If an entity already on the contact list initiates communication with the access control system 100, such an entity is not considered a new entity, and its contact count field on the contact list is simply incremented by 1.

The above-described process avoids the need for a revocation flag of the type described in the above-cited U.S. patent application Ser. No. 09/456,689. As a result, revoked components are always treated as new contacts and therefore require longer look-ups. This does not present a significant problem, however, because communication with revoked entities is eventually terminated anyway, as was indicated in step 408. In contrast, entities which are not revoked are entered into the contact list and will therefore yield faster look-ups.

Figure 5:
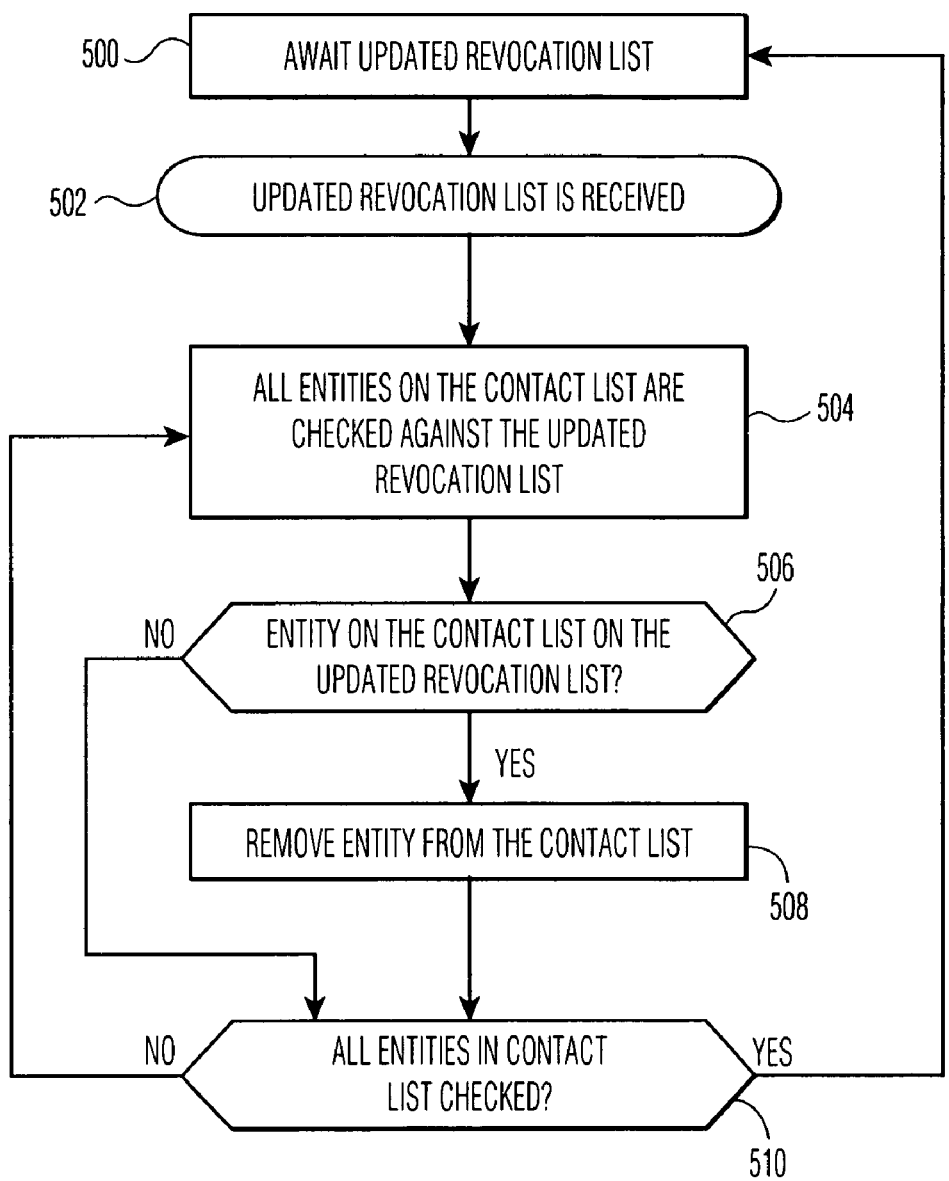

FIG. 5 is a flow diagram illustrating the manner in which the contact list 300 may be updated after the revocation list is updated or otherwise modified. It is expected that such modifications to the revocation list will occur periodically. For example, the local revocation list 150 may be modified, e.g., by replacer 130 in response to receipt of one or more broadcast revoked identifiers 122. The modifications may also occur under numerous other sets of circumstances.

In step 500 of FIG. 5, the process awaits an updated revocation list. An updated revocation list is received in step 502. In step 504, all entities on the contact list are checked against the updated revocation list. As part of this check, step 506 determines for a given entity on the contact list if the given entity is on the updated revocation list. If the given entity from the contact list is on the updated revocation list, it is removed from the contact list, as indicated in step 508. Step 510 then determines if all entities on the contact list have been checked. If not, the process returns to step 504 to continue the check of entities on the contact list. After all entities on the contact list have been checked, the process returns to step 500 to await another updated revocation list. Advantageously, the above-described FIG. 5 process, like that described in conjunction with FIG. 4, does not require the use of a revocation flag.

The following is a pseudocode example of an algorithm for implementing the processes described in conjunction with FIGS. 4 and 5 above.

```
Revocation List
ContactsList{ID, Count}
MakeContact
//Ensure that contacts are made rapidly for previously
//contacted, non-revoked components. Note that a revocation
//flag is not needed. For revoked components we don't care
//if look-ups take a while.
{
if (ContactID in ContactsList)
    UpdateContactsList(ContactID); //i.e., increment proper
//count
else if (ContactID in RevocationList)
    AbortCommunication(ContactID);
else
    EnterInContactsList(ContactID);//least freq. contacted
//replacement
    }
}
UpdateRevocationList
{
//Removed revoked components from contact list
    for (all ID in ContactsList)
        if (ID in RevocationList)
            RemoveFromContactsList(ID);
}
```

The above pseudocode is intended only as an example of one possible implementation of the processes described in conjunction with FIGS. 4 and 5. Numerous other implementations will be apparent to those skilled in the art.

The present invention in the illustrative embodiment described above ensures that entities that are not revoked will have an increased likelihood of being present in the contact list. This leads to faster authorizations for non-revoked entities, thereby improving the overall efficiency of the revocation list management process, and reducing the amount of computation time and other system resources consumed in access control operations.

The above-described contact list or a suitable portion thereof could be secured by generating a digital signature which is updated each time the contact list is modified.

It should be noted that a contact list such as that described above is generally stored by each entity in a given set of potentially communicating entities. However, the size or other characteristics of the particular contact lists used in a given application may vary from entity to entity.

As previously noted, the present invention can be implemented in a wide variety of different systems and devices, such as, e.g., a set-top box, a computer, a palm-top computing device, as well as portions or combinations of these and other processor-based devices.

The update processes described in conjunction with FIGS. 4 and 5 can be implemented at least in part in the form of one or more software programs configured for execution using a conventional processor, e.g., a microprocessor, digital signal processor, central processing unit, computer, circuit card, application-specific integrated circuit (ASIC), field programmable gate array (FPGA), or microcontroller, as well as portions or combinations of these and other types of processing devices. Such a processor may be configured in a conventional manner to operate with one or more memory devices, e.g., an electronic memory, an optical or magnetic disk-based memory, a tape-based memory, as well as portions or combinations of these and other types of memory devices.

The above-described embodiments of the invention are intended to be illustrative only. For example, the invention can be used to implement revocation list management in a wide variety of applications, systems and devices other than those described herein. Numerous alternative embodiments within the scope of the following claims will be apparent to those of ordinary skill in the art.

What is claimed is:

1. A method for controlling access to information, the method comprising:

maintaining, for a given entity controlling access to the information, a contact list comprising information identifying one or more other entities that have attempted to communicate with the given entity, and for each of at least a subset of the entities, a contact count specifying a number of times a corresponding one of the other entities has attempted to communicate with the given entity;

utilizing the contact list in conjunction with a revocation list associated with the given entity to determine which of at least a subset of the one or more other entities are authorized to communicate with the given entity;

updating the contact list to include a new entity that is not on the revocation list; and removing from the contact list an entity selected based at least in part on its corresponding contact count.

2. The method of claim 1 wherein
the given entity and at least a subset of the one or more other entities each comprise a consumer electronics device.

3. The method of claim 1 wherein
maintaining the contact list and utilizing the contact list are implemented in an access control system associated with the given entity.

4. The method of claim 3 wherein
the revocation list comprises a local revocation list stored in the access control system.

5. The method of claim 1 further including
updating the contact list after a modification of the revocation list.

6. The method of claim 5 wherein updating the contact list after the modification of the revocation list further includes:
identifying all of the entities on the contact list that are on the revocation list; and
removing from the contact list each of the entities identified as being on the revocation list.

7. The method of claim 1 further including updating the contact list if the new entity that is not already on the contact list attempts to communicate with the given entity.

8. The method of claim 7 wherein updating the contact list if the new entity that is not already on the contact list attempts to communicate with the given entity further includes:
determining if the new entity is on the revocation list;
storing in the contact list an entity identifier for the new entity if the new entity is not on the revocation list; and
terminating communication with the new entity if the new entity is on the revocation list.

9. The method of claim 1 wherein the entity selected for removal from the contact list is the entity on the contact list that has a lowest contact count.

10. The method of claim 1 further including periodically generating a digital signature for at least a portion of the contact list.

11. The method of claim 10 further including updating the digital signature each time the contact list is updated.

12. The method of claim 1 wherein each of at least a subset of the other entities stores a contact list having entries corresponding to entities which have attempted to communicate with those other entities.

13. An apparatus for controlling access to information, the apparatus comprising:
a processor that is configured to control access to the information,
wherein the processor is configured to:
maintain a contact list comprising information identifying one or more other entities that have attempted to communicate with the apparatus, and for each of at least a subset of the entities, a contact count specifying a number of times a corresponding one of the other entities has attempted to communicate with the apparatus,
utilize the contact list in conjunction with a revocation list associated with the apparatus to determine which of at least a subset of the one or more other entities are authorized to communicate with the apparatus; and
update the contact list to include a new entity that is not on the revocation list; and
remove from the contact list an entity selected based at least in part on its corresponding contact count.

14. An article of manufacture comprising a machine-readable storage medium containing one or more software programs for use in controlling access to information, wherein the programs when executed on a processing device causes the processing device to:
maintaining, for a given entity that controls access to the information, a contact list comprising information identifying one or more other entities that have attempted to communicate with the given entity, and for each of at least a subset of the entities, a contact count specifying a number of times a corresponding one of the other entities has attempted to communicate with the given entity;
use the contact list in conjunction with a revocation list associated with the given entity to determine which of at least a subset of the one or more other entities are authorized to communicate with the given entity;
update the contact list to include a new entity that is not on the revocation list; and
remove from the contact list an entity selected based at least in part on its corresponding contact count.

* * * * *